(12) United States Patent
Maier-Landgrebe

(10) Patent No.: US 6,360,837 B1
(45) Date of Patent: Mar. 26, 2002

(54) METHOD AND APPARATUS FOR ESTIMATING THE MAXIMALLY TRANSMISSIBLE DRIVE TORQUE IN A MOTOR VEHICLE

(75) Inventor: Rolf Maier-Landgrebe, Kernen (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 09/427,206

(22) Filed: Oct. 26, 1999

(30) Foreign Application Priority Data

Oct. 26, 1998 (DE) .......................... 198 49 322

(51) Int. Cl.$^7$ ............................................. B60K 28/16
(52) U.S. Cl. ........................... 180/197; 701/80; 701/84; 701/90
(58) Field of Search ........................ 180/197; 701/74, 701/75, 80, 84, 87, 90, 102

(56) References Cited

U.S. PATENT DOCUMENTS

| | | | | |
|---|---|---|---|---|
| 6,061,621 A | * | 5/2000 | Sasaki | 701/82 |
| 6,061,622 A | * | 5/2000 | Probst | 701/90 |
| 6,122,585 A | * | 9/2000 | Ono et al. | 701/80 |

FOREIGN PATENT DOCUMENTS

DE           44 30 180           2/1996

* cited by examiner

*Primary Examiner*—Anne Marie Boehler
(74) *Attorney, Agent, or Firm*—Kenyon & Kenyon

(57) ABSTRACT

A method and an apparatus for estimating a maximally transmissible drive torque in a motor vehicle. The actual drive torque is set as the maximally transmissible drive torque when an average wheel slip of the drive wheels passes through a predefined slip threshold value in the direction of increasing drive slip.

9 Claims, 3 Drawing Sheets

METHOD AND APPARATUS FOR ESTIMATING THE MAXIMALLY TRANSMISSIBLE DRIVE TORQUE IN A MOTOR VEHICLE

FIELD OF THE INVENTION

The present invention concerns a method and an apparatus for estimating a maximally transmissible drive torque in a motor vehicle.

BACKGROUND INFORMATION

A method and an apparatus of this kind are described in an example of a drive slip control system from German Published Patent Application No. 44 30 180, in which the maximally transferable drive torque of the drive unit of the motor vehicle is estimated on the basis of the estimated coefficient of friction between the drive wheels of the vehicle and the road surface. The drive torque generated by the drive unit is then held at that maximally transferable drive torque. A satisfactory estimate of the maximally transferable drive torque is made available with this procedure, but the estimate of the coefficient of friction can be subject to a few uncertainties.

It is therefore the object of the present invention to describe actions with which the determination of the maximally transmissible drive torque can be optimized.

The publication entitled "FDR—Die Fahrdynamikregelung von Bosch" (FDR—the Bosch Vehicle Dynamics Control System) written by Anton van Zanten, Rainer Erhardt, and Georg Pfaff, Automobiltechnische Zeitschrift (ATZ) 1996, pp. 674–689, describes a drive slip controller, subordinate to the vehicle dynamics controller, in which a so-called propeller shaft speed controller is used. The latter regulates the average wheel speed of the drive wheels to a predefined setpoint.

SUMMARY OF THE INVENTION

The approach according to the present invention makes available a reliable, optimized estimate of the maximally transmissible drive torque (at the wheel level).

It is particularly advantageous that the estimate is relatively easy and accurate: the result of the estimate is not impaired by gradients or slopes of the road surfaces, changes in the mass of the vehicle, or vehicle accelerations.

It is particularly advantageous that the estimate of the maximally transmissible drive torque is not adapted under certain conditions, for example, when the estimate would not lead to a satisfactory result. Operating situations of this kind are, for example, traveling through curves, an operating situation in which aquaplaning occurs, during a gear-change operation, and/or in the event of an active vehicle dynamics controller intervention and/or drive slip controller intervention.

It is particularly advantageous that the moment of inertia of the drive train can also be taken into account in estimating the maximally transmissible drive torque, thus making the estimate even more accurate.

DETAILED DESCRIPTION

Figure 1:
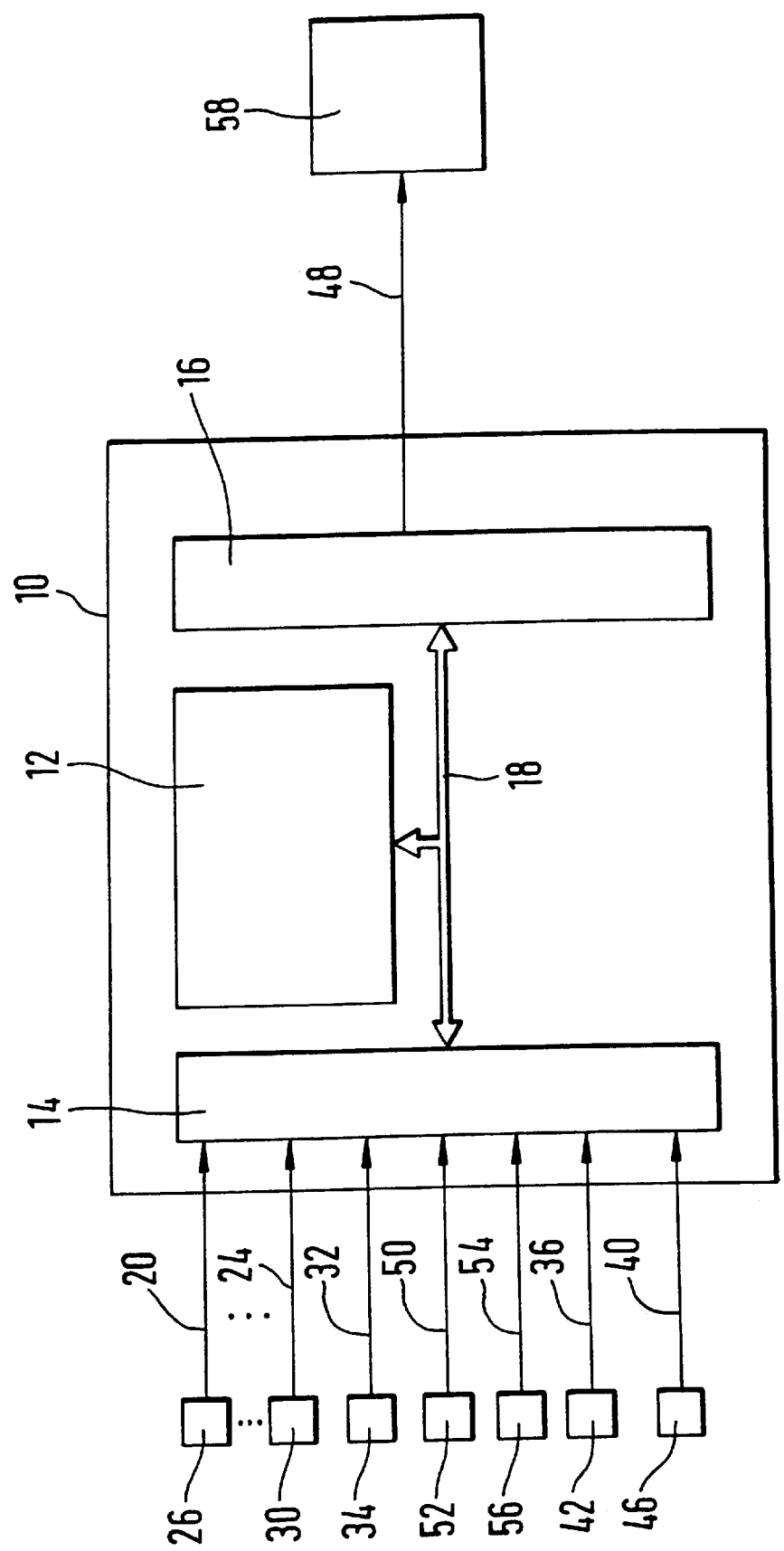
FIG. 1 shows a synoptic circuit diagram of a control unit for controlling the drive torque of a drive unit of a motor vehicle, in which an estimate according to the present invention of a maximally transmissible drive torque is implemented.

FIG. 1 shows a control unit 10 that essentially comprises at least one microcomputer 12, an input circuit 14, an output circuit 16, and a communications system 18 that connects the aforementioned components. Signals from measurement devices 26 through 30, representing the speeds of the vehicle wheels, are delivered via input lines 20 through 24 to control unit 10 and input circuit 14 therein. In addition, an operating variable representing the current drive ratio in the drive train, for example the currently selected gear ratio, is conveyed via a line 32 from a corresponding measurement device 34 to input circuit 14. In addition, a signal representing the actual torque of the drive unit of the motor vehicle is conveyed via an input line 50, for example from a measurement device 52 that can be part of an engine control unit. A variable representing the measured or estimated yaw velocity of the vehicle is delivered via an input line 54 from a corresponding measurement device 56 to input circuit 14. Also input lines 36 through 40 are provided. Input lines 36–40 deliver, from measurement devices 42 through 46, further operating variables of the drive unit and/or of the vehicle that are needed in conjunction with drive slip control systems and/or vehicle dynamics control systems. Examples of such operating variables are engine speed, various temperature variables, steering angle, etc. The measurement devices constitute sensors that ascertain the variables described or, in other embodiments, devices that determine the variables from one or more measurement signals and can also be part of control unit 10 or microcomputer 12. Via output line 43, control unit 10 influences a setting device 58, for example an engine control unit, to influence the drive unit of the vehicle.

Depending on the exemplary embodiment, the drive unit is an internal combustion engine, an electric motor, etc. This is immaterial in conjunction with the approach according to the present invention, since the latter is concerned with estimating the maximum drive torque that can be transmitted onto the road surface.

A knowledge of the maximally transmissible drive torque is important in drive slip controllers and/or vehicle dynamics controllers. In drive slip controllers, for example, different control gain factors are advisable depending on the operating state. The allowable gain is much less at low coefficients of friction than at high ones. A knowledge of the maximally transmissible drive torque makes it easier to change the controller parameters, since the transmissible drive torque is also much lower at a low coefficient of friction than at a higher coefficient. The controller gain factors can then be selected in accordance with the maximally transmissible drive torque.

A further operating situation in which a knowledge of the maximally transmissible drive torque is very important is a driving situation after an intervention by the drive slip controller or vehicle dynamics controller in which the engine torque has been reduced, and/or after the vehicle has exited from a curve, which is also associated with a reduction in the engine torque. In this case the maximally transmissible drive torque is used to set the drive torque, very shortly after termination of the operating situation set forth above, to the ultimately steady-state final value. This is particularly significant in conjunction with the propeller shaft controller of a drive slip control system mentioned in the conventional system cited initially, which contains an integrator that is intended to establish the steady-state final value of the drive torque. A knowledge of the transmissible drive torque makes it possible to establish the steady-state final value quite accurately, immediately after one of the operating situations set forth above has ended and at the beginning of the torque-increasing addition phase, so that undesirable delays are avoided.

Figure 2A:
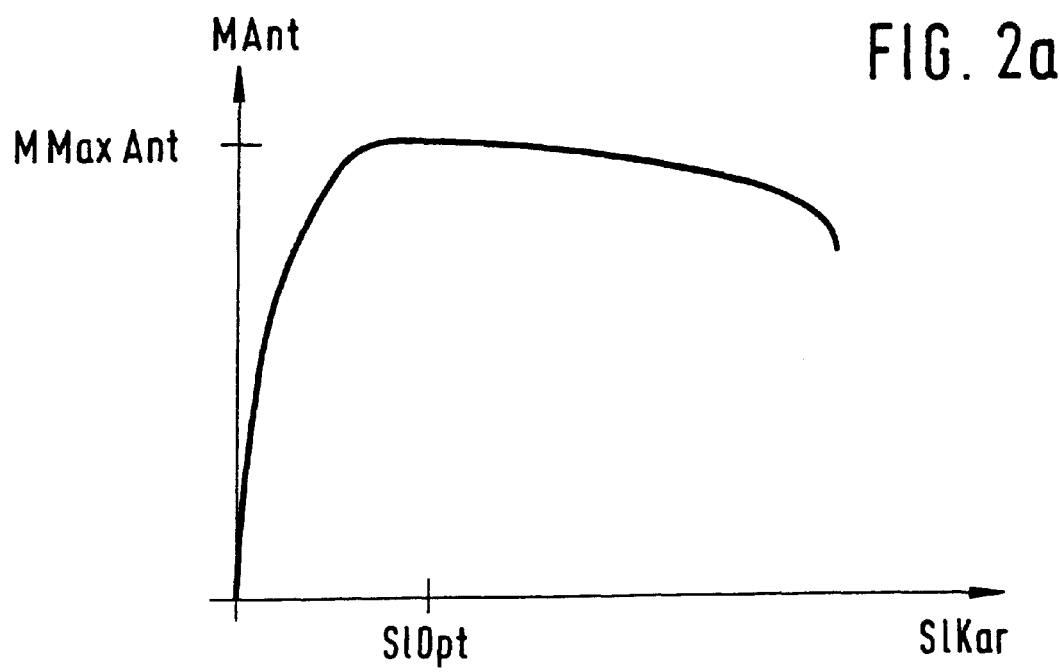
FIG. 2 shows an estimating principle with reference to slip curves.
Figure 2B:
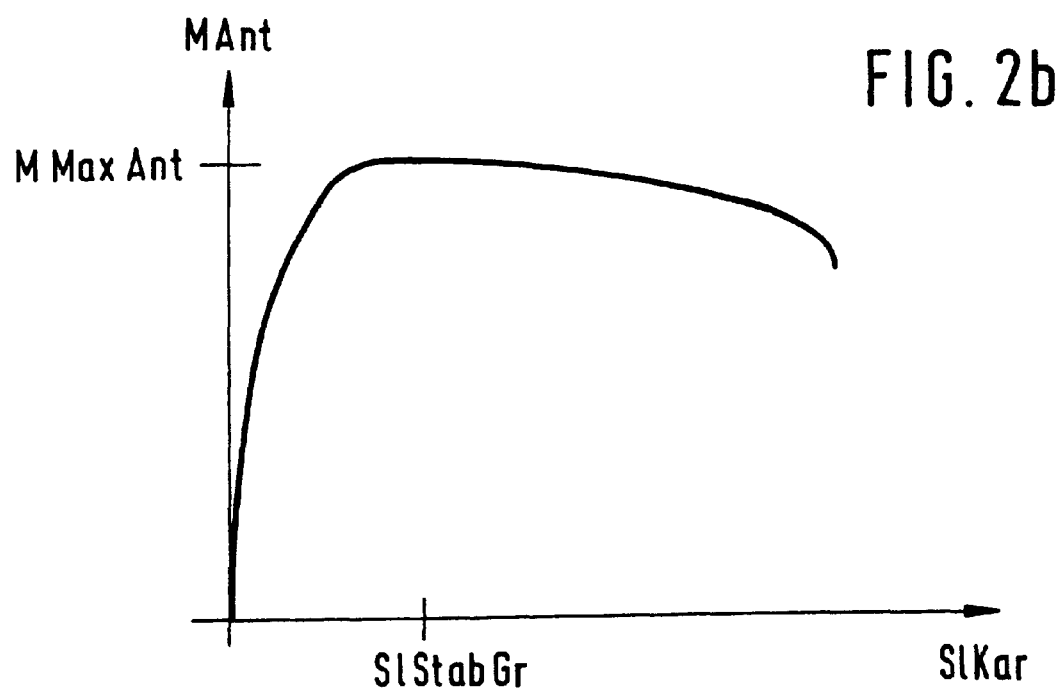

The basic principle for determining the maximally transmissible drive torque will be set forth below based on the diagrams in FIG. 2, in which the drive torque MAnt acting from the drive wheels on the road surface is respectively plotted against the average wheel slip SlKar of all the drive wheels. As FIG. 2a shows, the maximally transmissible drive torque MMaxAnt represents the maximum of the slip curve. The maximally transmissible drive torque can thus be ascertained by storing the drive torque at the point when the average wheel slip SlKar of the vehicle's drive wheels passes in the positive drive slip direction through the optimum slip value SlOpt, which is associated with the maximum of the slip curve. In practical implementation, this basic principle is adapted to the existing conditions by the fact that, as depicted in FIG. 2b, instead of the slip optimum, the slip threshold SlStabGR is utilized to determine the maximally transmissible drive torque in the manner set forth above. The reason for this is that in practice, the optimum slip SlOpt varies, for example, as a function of the coefficient of friction. The slip threshold for determining the maximally transmissible drive torque is derived on the basis of the reference slip value for the drive slip controller, which because of the requirement for good traction always lies in the vicinity of the slip optimum.

In the preferred exemplary embodiment, the maximally transmissible drive torque is determined by a computer program of microcomputer 12. An example of this is depicted as a flow chart in FIG. 3.

Figure 3:
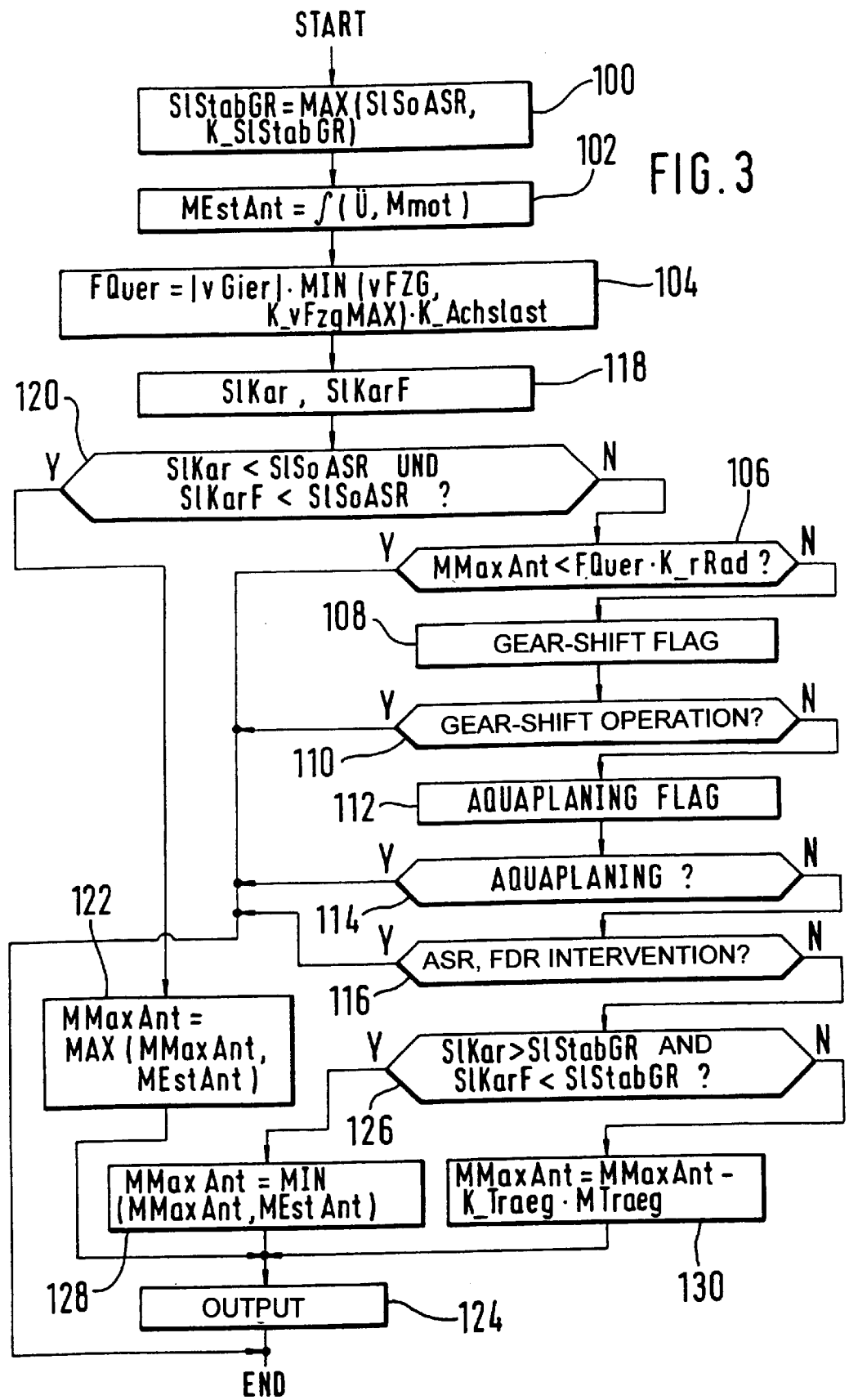
FIG. 3 shows a flow chart illustrating a preferred exemplary embodiment of the present invention.

The program outlined in FIG. 3 is executed at predefined time intervals. In first step 100, the slip threshold SlStabGr that is the basis for the drive torque determination is determined. In the preferred exemplary embodiment in which a drive slip controller as recited initially is being used, this is done by utilizing the reference torque for the propeller shaft controller SlSoASR, which, in order to provide good traction, lies in the vicinity of the slip optimum. With the known approach, in critical driving situations this reference torque is reduced in the interest of lateral stability and at the cost of traction. A further applicable parameter (K_SlStabGR) is therefore utilized in addition to the determination of the slip threshold value SlStabGR. The slip threshold value is then constituted as the selected maximum value of these two variables. One example of the value of the applicable parameter is 4%.

After the determination of the slip threshold value, in step 102 the current drive torque MEstAnt, made up of the actual torque Mmot conveyed from the engine control device and the torque conversion ratio Ü in the drive train is determined.

In the next step 118, the average wheel slip SlKar of all the drive wheels, and the average wheel slip SlKarF of all the drive wheels after filtration, e.g. low-pass filtration, is read in. The, next step 120 tests whether the addition phase is present, i.e. whether the drive torque is rising. This is the case if the average wheel slip and the filtered average wheel slip are less than the reference slip SlSoASR. In this case, in step 122 the maximally transmissible drive torque is determined as a function of the selected maximum of the stored maximally transmissible drive torque and the drive torque calculated in step 102. In step 124, this value is outputted to the engine control device and the program is terminated. The engine control device establishes this value in at least one operating state. If the condition in step 120 is not met, the controller is in the reduction phase, i.e. in a phase in which drive torque is being decreased.

In the next step 104, the contribution of the drive wheels to the transverse force FQuer is estimated. This is done as a function of the measured or estimated yaw velocity vGier, the vehicle speed vFZG that is created on the basis of the wheel speed signals, an applicable maximum speed K_vFzgMAX to reduce the calculation sensitivity at high speeds, and a constant K_Achslast (axle load), that is determined from the sum of the static wheel loads of the driven wheels. In the preferred exemplary embodiment, the following relationship is used:

$$FQuer = |vGier| \times MIN(vFZG, K\_vFzgMAX) \times K\_Achslast$$

The subsequent query step 106 tests whether the currently stored maximally transmissible drive torque MMaxAnt is less than the product of the transverse force FQuer and wheel radius K_rRAD. If so, the vehicle is traveling through a curve, in which the maximally transmissible drive torque determined as described below would be too low. If the condition in step 106 is present, no adaptation of the maximally transmissible drive torque is performed, and instead the program is terminated and repeated at a given time. The reason behind this action is that the greater the slip angle (i.e. the more extreme the curve), the flatter the profile of the slip curves depicted in FIG. 2.

If the condition in step 106 is not met, then in step 108 a marker is read in that is set during a gear-shifting operation. This marker is then checked in step 110 to determine whether a gear-shifting operation is present. Temporarily excessive drive torques can occur during a gear-shifting operation, with a very sharp short-term rise in wheel slip. This would meet the conditions provided for adaptation of the maximally transmissible drive torque, so that a short-term disruption occurs in the maximally transmissible drive torque. If a shifting operation is present, adaptation of the drive torque is therefore not performed and the program terminates.

If the answer in step 110 is No, then in step 112 a flag indicating an aquaplaning operating state is read in. This flag is set, for example, as a function of the wheel speeds of the driven and undriven wheels. If an aquaplaning operating state is present as defined in query step 114, the adaptation is not performed. Otherwise step 116 tests whether a vehicle controller is intervening in vehicle-stabilizing fashion, i.e. whether any intervention by the drive slip controller and/or vehicle dynamics controller is present. The drive torque is reduced by the controller in an operating situation of this kind, so that the maximally transmissible drive torque would not reflect the drive torque that is actually transmissible. An active intervention also causes the program to terminate, and adaptation of the maximally transmissible drive torque is not performed.

In this reduction phase, it may happen that the reference torque passes through the slip threshold value SlStabTGR in the positive drive slip direction. This is tested in step 126 that follows step 116 in the event of a No response, such being the case if the reference slip SlKar is greater than the slip threshold value, and if the filtered average wheel slip is less than that slip threshold value. In this case, in step 128 the estimated drive torque MEstAnt is stored as the maximally transmissible drive torque. The maximally transmissible drive torque is then set as the selected minimum of the stored maximally transmissible drive torque and the drive torque constituted in step 102. Step 124 then follows, with output of the maximally transmissible drive torque to the engine controller. If the condition in step 126 is also not met, and if the determination of the maximally transmissible drive torque in step 128 has already been performed (which is detected based on a flag not depicted in FIG. 3), then in an advantageous exemplary embodiment, during the reduction phase the moment of inertia of the drive train can additionally be taken into account. This moment of inertia MTraeg is constituted, for example, by multiplying a predefined inertial moment of the drive train by the filtered time derivative of the difference between the average wheel speeds of the drive wheels and the vehicle reference speed. In this case, in step 130 the moment of inertia, if it has assumed its maximum, is subtracted from the stored maximally transmissible drive torque. A weighting constant K_Traeg, which is between zero and one (MMaxAnt= MMaxAnt−K_Traeg×MTraeg), is used in this context. After step 130, the maximally transmissible drive torque that has been determined is outputted to the engine controller, and the program terminates.

The maximally transferable drive torque is determined at the wheel level, i.e. corresponds to the drive torque exerted by the wheels on the road surface. In other exemplary embodiments, this is converted into a different torque in the drive train, for example into a maximally transferable drive torque of the drive unit that is present at the output of the drive unit. This can be calculated from the maximally transmissible drive torque taking into account the torque conversion in the drive train. The term "drive torque" is to be understood in this sense.

In another exemplary embodiment, calculations are performed not on a torque basis but on a power basis, taking into account the rotation speed in the drive train. An approach of this kind is also understood as an aforementioned estimate of the maximally transmissible drive torque.

What is claimed is:

1. A method for estimating a maximally transmissible drive torque in a motor vehicle, comprising the steps of:
   controlling a drive unit in at least one operating situation in accordance with the maximally transmissible drive torque; and
   accepting a drive torque as the maximally transmissible drive torque when a wheel slip of at least one drive wheel passes through an optimum slip value in a positive drive slip direction.

2. The method according to claim 1, further comprising the step of:
   determining the optimum slip value in accordance with a slip threshold value corresponding to one of a setpoint for a drive slip and an applicable predefinable parameter.

3. The method according to claim 1, further comprising the steps of:
   estimating the drive torque; and
   setting the maximally transmissible drive torque to the estimated drive torque if the estimated drive torque is greater than a stored maximally transmissible drive torque and the wheel slip is below the optimum slip value in a direction of increasing wheel slip.

4. The method according to claim 1, further comprising the steps of:
   estimating the drive torque; and
   storing the estimated drive torque as the maximally transmissible drive torque if the estimated drive torque is less than a stored maximally transmissible drive torque and the wheel slip passes through a slip threshold value in the positive drive slip direction.

5. The method according to claim 1, further comprising the step of:
   reducing the maximally transmissible drive torque by a value if the wheel slip changes in a direction of decreasing drive slip, the value corresponding to one of a moment of inertia of a drive train and a weighted moment of inertia of the drive train.

6. The method according to claim 1, further comprising the step of:
   refraining from adapting the maximally transmissible drive torque if at least one of the following conditions exists:
   the motor vehicle is traveling in a curve,
   an aquaplaning is detected,
   a gear-shifting operation is present, or
   a vehicle controller is intervening in a stabilizing fashion.

7. The method according to claim 1, wherein the wheel slip is an average slip of each of the at least one drive wheel.

8. The method according to claim 1, wherein the maximally transmissible drive torque is one of a torque delivered by the at least one drive wheel onto a road surface, a torque occurring in a drive train, and a corresponding power.

9. An apparatus for estimating a maximally transmissible drive torque in a motor vehicle, comprising:
   a first control unit for determining the maximally transmissible drive torque and delivering for setting purposes the maximally transmissible drive torque in at least one operating state to a second control unit; the first control unit including an estimator for accepting a drive torque as the maximally transmissible drive torque when a wheel slip passes through a slip threshold value in a positive drive slip direction.

* * * * *

UNITED STATES PATENT AND TRADEMARK OFFICE
CERTIFICATE OF CORRECTION

PATENT NO.   : 6,360,837 B1
DATED        : March 26, 2002
INVENTOR(S)  : Rolf Maier-Landgrebe It is certified that error appears in the above-identified patent and that said Letters Patent is hereby corrected as shown below:

<u>Column 2,</u>
Line 36, change "43" to -- 48 --.

Signed and Sealed this

Nineteenth Day of August, 2003

JAMES E. ROGAN
*Director of the United States Patent and Trademark Office*